S. B. AUSTIN.
RECORDING AND ADDING MACHINE.
APPLICATION FILED JAN. 14, 1909. RENEWED JUNE 22, 1912.

1,034,055.

Patented July 30, 1912.

6 SHEETS—SHEET 3.

Attest:
Ewd L. Tolson.
Benj. M. Stahl.

Inventor:
Sydney B. Austin,
By Spear, Middleton, Donaldson & Spear
Attys.

S. B. AUSTIN.
RECORDING AND ADDING MACHINE.
APPLICATION FILED JAN. 14, 1909. RENEWED JUNE 22, 1912.
1,034,055.
Patented July 30, 1912.
6 SHEETS—SHEET 4.
Fig. 4.
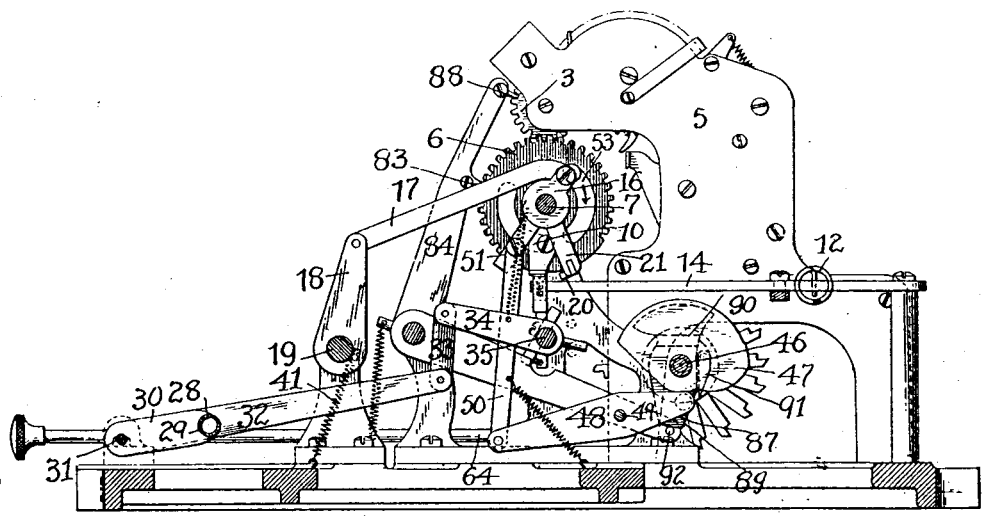
Fig. 5.
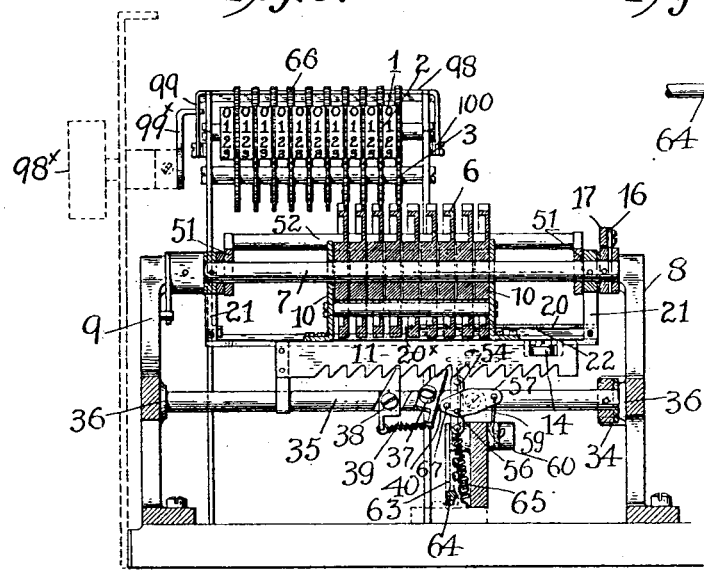
Fig. 8.
Attest:
Ewd L. Jolson
Bent M. Stahl
Inventor:
Sydney B. Austin,
By Spear, Middleton, Donaldson & Spear
Attys.

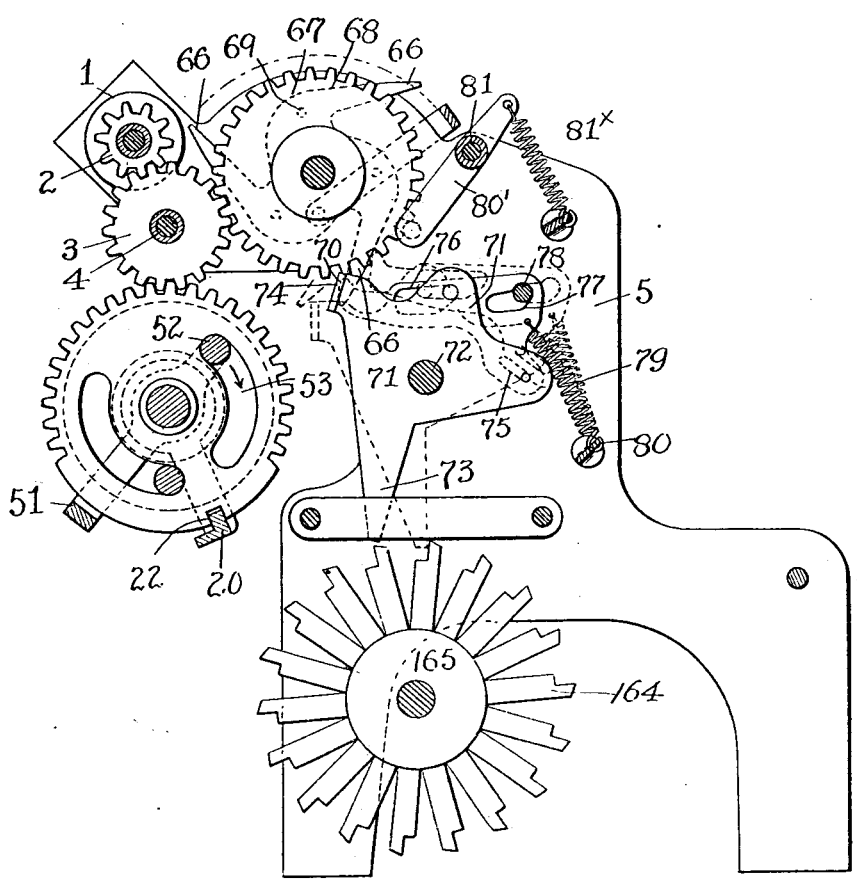
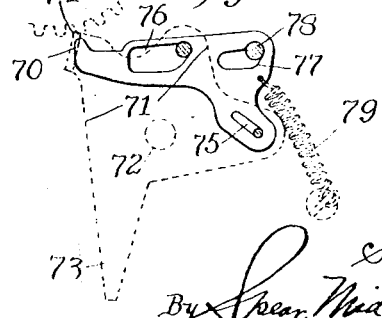

S. B. AUSTIN.
RECORDING AND ADDING MACHINE.
APPLICATION FILED JAN. 14, 1909. RENEWED JUNE 22, 1912.

1,034,055.

Patented July 30, 1912.
6 SHEETS—SHEET 6.

Attest.
Bent M Stahl
Chas. F. Calhoun

Inventor:
Sydney B. Austin
By Spear, Middleton, Donaldson & Spear
Attys.

UNITED STATES PATENT OFFICE.

SYDNEY B. AUSTIN, OF PIKESVILLE, MARYLAND, ASSIGNOR, BY MESNE ASSIGNMENTS, TO AUSTIN ADDING MACHINE CORPORATION, OF DELAWARE.

RECORDING AND ADDING MACHINE.

1,034,055.      Specification of Letters Patent.      Patented July 30, 1912.

Application filed January 14, 1909, Serial No. 472,387. Renewed June 22, 1912. Serial No. 705,308.

*To all whom it may concern:*

Be it known that I, SYDNEY B. AUSTIN, citizen of the United States, residing at Pikesville, Maryland, have invented certain new and useful Improvements in Recording and Adding Machines, of which the following is a specification.

My invention relates to adding and recording machines involving improvements on that type of machine disclosed in Letters Patent of the United States granted to G. W. and A. L. Dudley, November 4, 1902, #712777.

One object of my invention is to provide means whereby the adding mechanism may be combined with and attached to a typewriter of ordinary form and of various makes now on the market.

A further object of my invention is to generally simplify the adding mechanism; provide means for insuring accuracy of operation by preventing overthrow or underthrow of the parts; provide means for insuring certainty and accuracy of movement of the accumulator or transferring mechanism; provide simple and effective means for returning the number disks to zero, and to generally improve the construction and operation of the machine, as will be hereinafter described.

The invention consists in the features and combination and arrangement of parts referred to and particularly pointed out in the claims.

Figure 1:
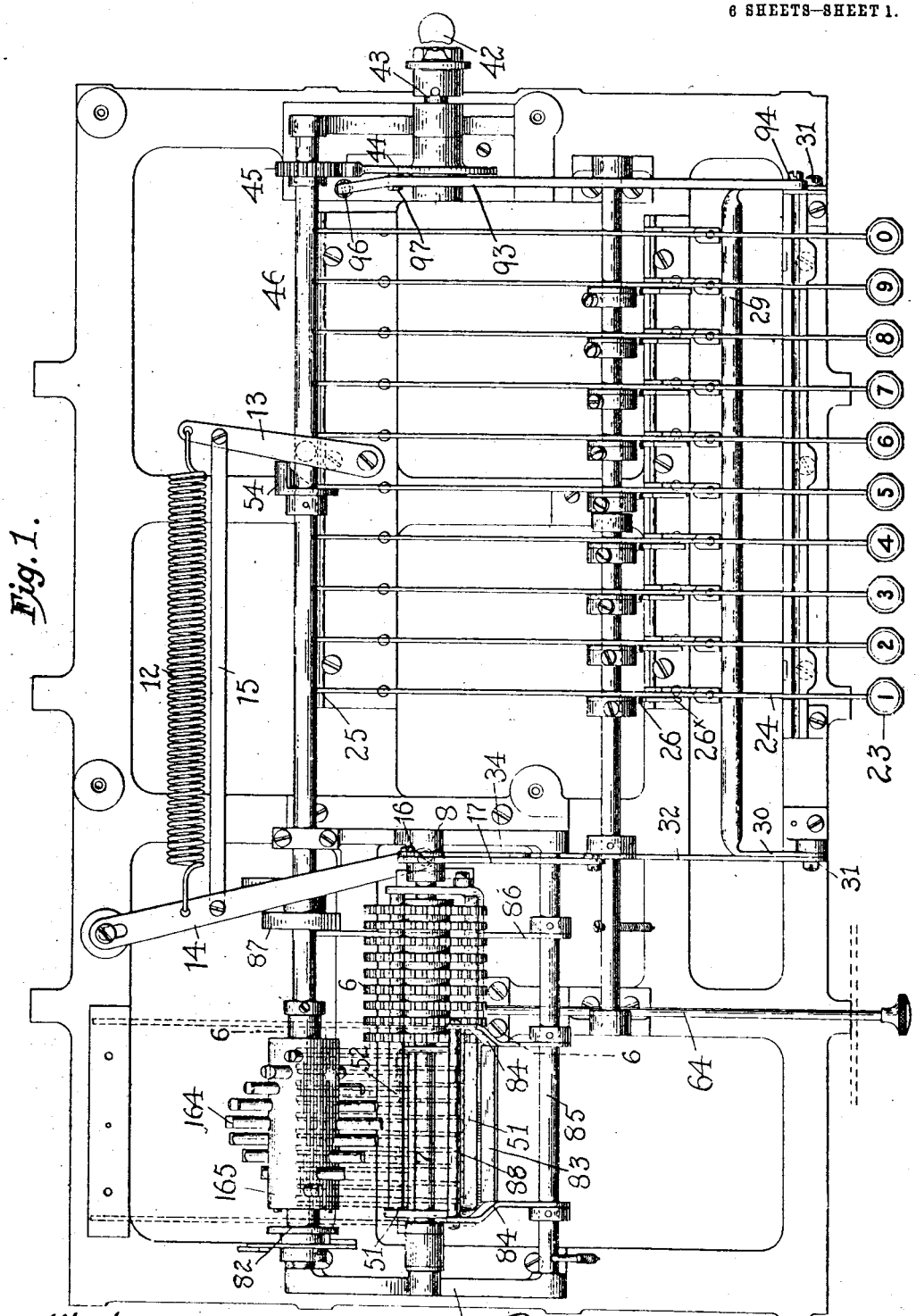
Figure 2:
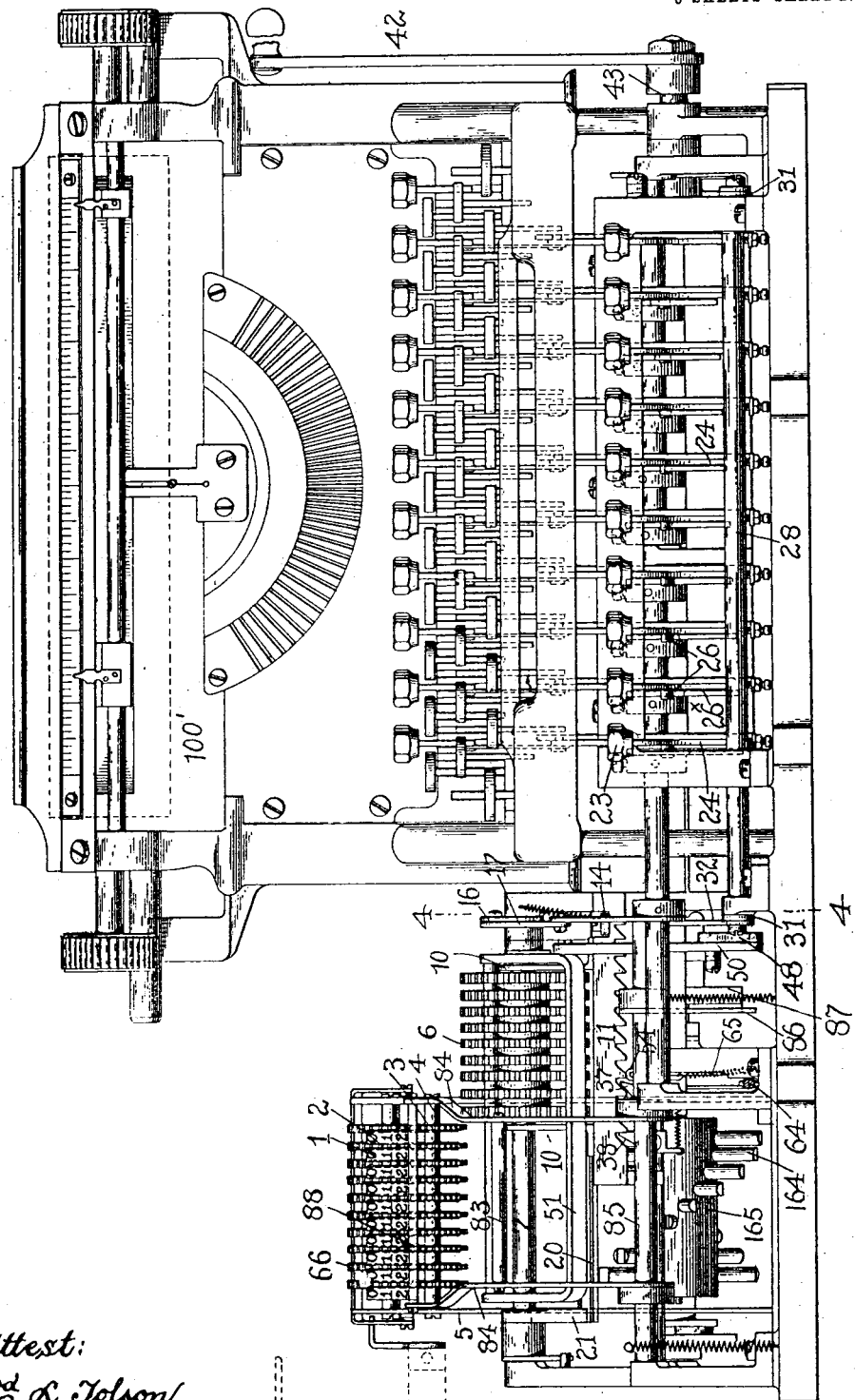
Figure 3:
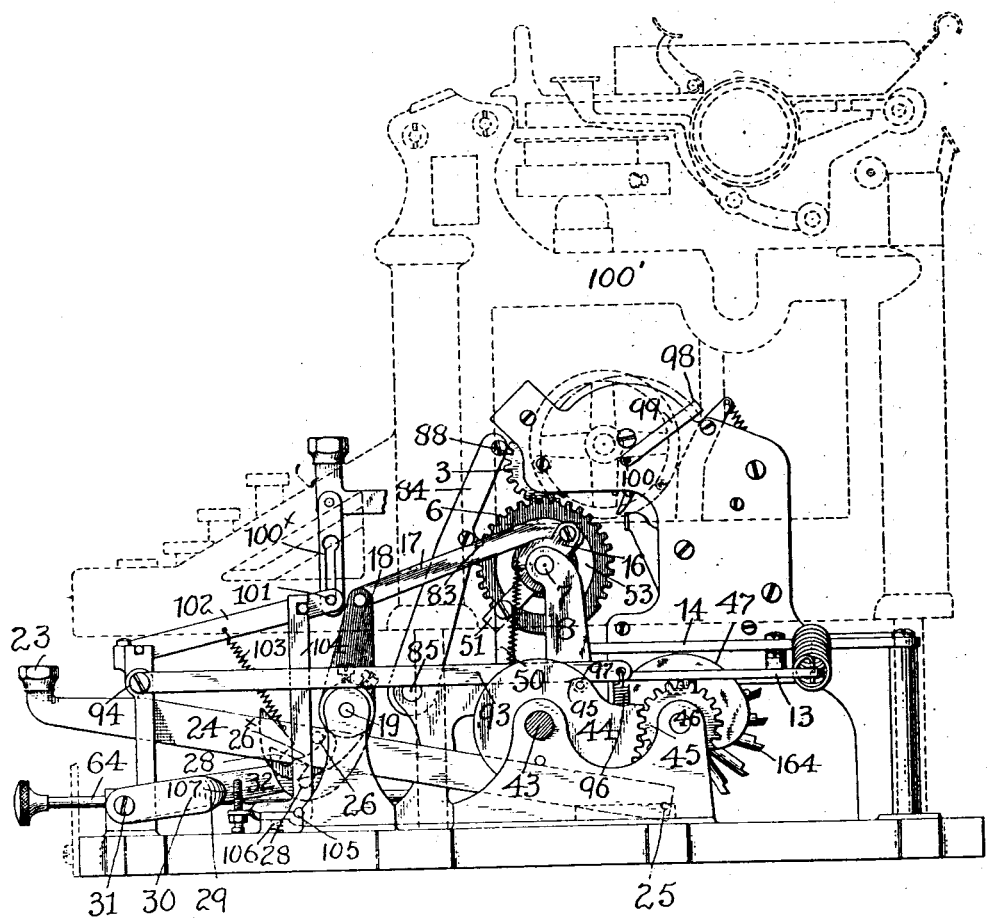
Figure 9:
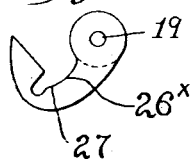

In the drawings:—Figure 1 is a plan view of a machine embodying my invention with the recording mechanism and the accumulator mechanism omitted; Fig. 2 is a front view of such machine; Fig. 3 is a side view looking from the right of Fig. 1 with the recording or typewriting machine indicated generally in dotted lines; Fig. 4 is a sectional view on line 4—4 of Fig. 2 looking from the right; Fig. 5 is a detail sectional view along the selector shaft; Fig. 6 is a sectional view of the accumulator mechanism substantially on the line 6—6 of Fig. 2; Fig. 7 is a view of a detail relating to the accumulator mechanism; Fig. 8 is a view of a detail; Fig. 9 is a detail view of a cam shaped arm operated by the key lever; Figs. 10 to 13 inclusive are views of the carrying mechanism in different positions.

*Adding mechanism.*—1 indicates the number wheels or adding disks, each of which has a gear 2 which meshes with transmitting gears 3 on a shaft 4, supported in the frame 5 of the accumulator mechanism. These transmitting gears are engaged by toothed selectors preferably in the form of wheels 6, which, as a group, lie to one side of the transmitting gears, and disengaged therefrom when the machine is in normal condition ready for operation by pressing the keys. This relation of the parts is shown in Fig. 1.

The selectors are on shaft 7 supported in standards 8 and 9. As a group, they are adapted to move axially, for which purpose they are confined between brackets 10 of a rack bar or carrier 11, which is driven, when released from its escapement, by a coil spring 12 through the levers 13, 14, and link 15, as will be hereinafter described. The selector shaft 7 is rotated to turn the group of selectors, through arcs corresponding in degree to the value of the adding keys operated, by an arm 16 fixed thereon, Figs. 1 and 4, a curved link 17 and an arm 18 on a shaft 19 journaled in bearings in the frame, and operated each time one of the adding keys is operated, excepting the 0 key.

The rock shaft 7 has a spline bar 20 fixed thereto by arms 21, and the wide part 22 of this spline bar engages a notch of each selector wheel, as shown in Figs. 4 and 7, so that, when the group of selectors are in the position shown in Figs. 1, 2, and 6, all of them will be engaging the wide part of the spline bar, and upon the depression of any adding key the whole group will rotate forwardly in the direction of the arrow, Figs. 4 and 7, due to the spline bar rotating with the rock shaft 7. The degree of rotary movement corresponds to the value of the key operated, for instance, the 1 key will rotate the selectors through an arc equal to one tooth, the 2 key through an arc equal to two teeth, and so on up to and including the 9 key. The adding keys 23 are carried by levers 24 pivoted at 25 to the frame, each having a pin 26 to operate, as the key lever is depressed, a cam shaped arm 26ˣ fixed to the shaft 19. The cam shaped members or arms are of the same form, but they differ as to their respective locations on the transmitting shaft, and, consequently, as to their relation individually to the pins on the adding key levers, so that different degrees of rotary movement will be imparted to said transmitting shaft and, therefore, to the selectors operated thereby.

Each cam member or arm has a curved edge 27 to be borne upon by the pin on the key lever for turning the transmitting shaft, and each is provided with a locking portion consisting of a notch or recess 28 formed in the cam arm to receive the pin on the key lever immediately the cam arm has been turned through the predetermined arc corresponding to the value of the key operated. These notches or locking recesses are each struck on an arc the radius of which is the distance of the pin 26 from the pivot 25 of the key lever, so that when the pin, after operating the cam arm, enters this locking notch or recess, it will, by contact with the walls thereof, hold the cam arm rigidly against further movement, and thus hold the transmitting mechanism leading to the selectors and the selectors themselves, against either overthrow or rebound, which would result in underthrow. After entering this locking notch, however, the pin, together with the key lever, can continue its downward movement some distance, while holding the operating connections leading from the shaft to the selectors rigidly against overthrow or underthrow, so that this further movement of the key lever may, in proper order, perform the additional functions dependent thereon, namely; the operation of the escapement mechanism of the selector carriage or rack bar and the release of the trip which controls the operation of the corresponding figure key of the typewriting or recording machine.

*Escapement action of selectors.*—The shifting movement of the selectors step by step along the shaft 7 and as a group, takes place as a result of the continued depression of the key levers, after they have turned forward the selectors, through arcs corresponding to the values of the keys operated, and is due to the contact of the key lever with a universal space bar 29 of a frame having its forwardly extending arms 30 pivoted to the frame at 31. This frame has a rearwardly extending arm 32 connected by a link 33 and an arm 34 on the escapement rock shaft 35 Figs. 4 and 5 journaled in the frame at 36. This rock shaft carries two escapement dogs 37, 38, each pivoted to and preferably in a recess in the rock shaft, and both being under tension of a spring 39 connecting with their tail portions, the tendency of this spring being to swing the upper or engaging end of the dog 37 to the right, Fig. 6, while the upper or engaging end of the other dog 38 is pressed normally leftward. The dogs extend at different angles in relation to the axis of the shaft, the dog 38 being normally in engagement with the rack bar 11 of the selector carriage, while the other dog 37 lies normally with its upper end to one side of the said rack bar.

It will be understood that the selector carriage is under tension of the spring 12, exerted through the lever 14, constantly tending to force the carriage leftward, the carriage, however, being normally held against the tendency of this spring by the dog 38 which, itself, is held against swinging leftward by the wall of the recess in which it is located. Now, when a key is depressed and the escapement rock-shaft is turned forwardly, the dog 37 is carried into engagement with the rack bar and at the same time the dog 38 is carried out of engagement with the rack bar, and as soon as this occurs, the carriage makes a partial step movement leftward, because the dog 37 can swing in this direction until stopped by the wall of the recess at 40. At the same time, and upon the release of the dog 38 from the rack bar, it moves or swings toward the left under the action of the spring 39, and gets in position ready to engage the next tooth of the rack bar when the rock shaft turns back upon the release of the key, and when the key rises, the dog 38 will again engage the rack bar and hold the carriage when its full step movement is completed. By the operation of these dogs, the carriage is given a complete step movement each time a numeral key is depressed. When, now, the selectors have been rotated forwardly through the proper angle, and have been accurately arrested and held by the locking notch 28 of the operating cam, and the key is continuing on its downward movement, the space frame will be depressed, and through the connections the escapement rock shaft will be turned, thus giving a partial step movement to the selector carriage, which movement is immediately completed on the release of the key. In this way, the whole group of selectors will be moved one step leftward from the position shown in Figs. 1 and 2, and the selector at the extreme left of the group will engage the first one of the transmitting gears 3, *i. e.*, the one at the right of the group.

It will be seen from Fig. 6 that the selectors are loose on the shaft 7, and are free to shift along it. As a result of the shifting one step, just described, the selector at the left of the group has disengaged itself from the spline bar 20, which, it will be observed, is cut down or shouldered at 20ˣ, so that, when the selector has shifted to the left, past this shoulder, it is no longer connected with the shaft so far as rotation is concerned, and, therefore, it will remain in its advanced or forward position to which it has been rotated even after the key is released, for it is now in engagement with the guide bar 83 and with the transmitting gear 3 and thereby with the number wheel corresponding thereto. On the release or rise of the key, however, all the other selectors which lie to the right of the shoulder 20˟ and are, therefore, still engaging the spline bar, are rotated back to normal position by means of the spring 41 connected with the transmitting shaft 19.

I have now described how the selectors are moved forwardly, preferably rotatively, upon the depression of any of the keys from 1 to 9; how this rotary movement is accurately arrested as a result of depressing the keys; how the selector carriage or rack then shifts to the left as the key completes its full movement down and up so that the selector at the left of the group will engage the first transmitting gear 3 leading to the adding wheels 1, and how, on the release of the key, all the selectors not engaging the transmitting gears are returned to normal position with the spline bar and shaft 7, leaving the engaged selector in advanced position, because, in engaging the transmitting gear 3, it has disengaged itself from the spline bar and, consequently, from the shaft 7 and the key so far as rotating movement is concerned. Supposing now another adding key, or, in fact, the same key, is depressed, a similar series of actions takes place, the remaining selectors of the group, that is, those excepting the ones engaging the transmitting gears, will be advanced and will shift another step to the left while held against rotation by the bar 83, thus making the previously advanced selector engage the second transmitting gear of the group and causing the second selector to engage the first transmitting gear, and upon release of the key these two selectors will remain in their advanced or forward position and in engagement with the two transmitting gears, while all the other selectors will rotate back to normal position. These actions are repeated until all the keys corresponding to the digits of the number to be added are operated, and the selectors have rotated through the different angles corresponding to the values of the keys depressed, and have gotten into engagement with the transmitting gears, whereupon the machine is ready to be operated to transmit these values or register them on the adding disks. For this purpose it is simply necessary to rotate all advanced selectors back to normal position, whereupon that selector which had been set or rotated forward, say, for instance, three teeth or spaces, and that which has been rotated or set in advance rotatively five spaces, and the one which has been set forward, say, seven spaces, owing to the depression of the 3, 5 and 7 keys, will, in returning to normal position, rotate the transmitting gears 3 through angles corresponding respectively to the angles or degrees that the respective selectors have been advanced, namely: one through the space of three teeth, the next through the space of five teeth, and the other seven teeth, and this movement will be transmitted to the number disks and they will register the values of the operated keys. This return to normal position of the engaged selectors is due to the operation of the handle 42 at the right of the machine, the shaft 43 of which has a segment 44 meshing with a gear 45 fixed on the rock shaft 46 journaled in the frame. This shaft has a cam 47 fixed thereon engaging a lever 48 pivoted to the frame at 49 and connected by a link 50 with a bail or frame 51 mounted to turn loosely on the shaft 7 of the selectors and carrying a selector returning bar 52 which passes through slots 53 in the selectors. Now, when the handle 42 is drawn forward, after more or less of the selectors have been turned and set into engagement with the transmitting gear wheels 3, the return or pick-up bar 52, through the described connections, will be moved in the arrow direction, Figs. 4 and 6, and, striking the end wall of the slot 53 of those selectors which have been advanced from normal position, will return these selectors to normal position, and in this movement the transmitting gears 3 will be turned to register the values on the number disks according to which keys have been operated.

The above described movement of the selectors are substantially the same as those described in the patent above referred to, the means for moving them and for arresting them to prevent overthrow or underthrow and for returning them to normal position, as well as the escapement mechanism being, however, improvements upon the invention disclosed in said patent.

In addition to the movements imparted to the selectors by the operation of the handle, as above described, the said handle, as in the patent referred to, in the final part of its movement, returns the group of selectors to the right or to disengaged position in relation to the transmitting wheels 3. For this purpose a cam 54 Fig. 1 is fixed to the rock shaft 46 to turn the lever 13 to the right as the handle is completing its forward movement, and this, through the link 15 and the lever 14 connected pivotally and directly to the rack or carriage of the selectors, will return the same to the right and withdraw all of the selectors from engagement with the transmitting gears, they then occupying the position at the right of the said transmitting gears as shown in Figs. 1 and 2.

When the lever 13 swings to the right, it will place the spring 12 under full tension ready to move the selector carriage leftward step by step as the escapement mechanism is operated by the keys. This spring, it will be seen, instead of being secured to a fixed point on the frame, is attached to the lever 14 nearer the pivot thereof than the point at which the other end of said spring is attached to lever 13 in relation to its pivot, and as a result of this the spring moves bodily in performing its function, at the same time contracting slightly as it imparts the step by step movement to the selector carriage.

*Correcting or eliminating mechanism.*—This mechanism relates to means for correcting or eliminating a mistake of the operator without transmitting the same to the accumulator or adding mechanism; that is to say, should the operator have struck the keys incorrectly and the selectors have become engaged with the transmitting gears. It is possible, by my present improvement, to return the selectors to their disengaged position without transmitting their values to the number wheels. For this purpose a pawl 54 having a tooth or pin 55 Figs. 5 and 8 normally disengaged from the rack of the selector carriage, being pivoted at 56 to a lever 57 pivoted to a post 58 of the frame and connected by a link 59 with an arm 60 on a rock shaft 61 mounted in a bracket 62, and having another arm 63 connected to or engaged by a push rod 64 sliding in suitable bearings in the frame. The pawl is under tension of a spring 65 attached to its tail piece and to the frame, and when the lever 57 is operated from the push rod the pawl 54 will be thrown into engagement with the tooth of the rack of the selector carriage, and will move the same to the right a distance equal to one-half of the regular step movement of the carriage, the action being limited in any suitable manner so that the selectors which were engaged with the transmitting gears 3, will occupy positions opposite the spaces between the said gears and then, by operating the handle 42, the selectors will be first rotated back to normal position by the pick-up or return bar without setting up or transferring the values to the number wheels, and then the continued movement of the handle 42 toward the front will return the whole group of selectors to disengaged position at the right. The spring pawl 54 is controlled in its position by a stop pin 67 on the lever 57. The employment of the spring 65 allows the rack to move over the pawl to the right should the pawl be held in engagement with the rack teeth by continued pressure of the hand on the push rod, even after the selectors have been rotated back to normal position. It will be observed that the employment of this correcting or eliminating device enables the operator, after he has caused the selectors to engage certain of the transmitting wheels, to free the said selectors therefrom and to return them to normal position and to disengaged position without, in any way, affecting the transmitting gears 3 or setting up the values on the number disks. It will be seen also that the special form of escapement which I employ lends itself to the use of the correcting device in that the escapement dog or pawl which normally engages the rack is free to tilt at all times, when the rack is moved to the right.

*Carrying mechanism for the accumulator.*—This, in the patent above referred to, included a pin marked 162, one on each number disk, which, when said disk has been rotated to the point where it is to carry its value onto the disk of the next higher order, pressed upon a lever and set the carrying mechanism in such position as to enable it to be operated by the appropriate one of the pins 164 on a pin drum 165 operated by the hand lever corresponding to that herein marked 42. Instead of using these pins on the number wheels to set the carrying mechanisms ready for action, I employ a series of points or arms 66 which, instead of being located on the number disk which is of comparatively small diameter, I place on an intermediate gear 67 of larger diameter than the number disks, and these points project beyond the toothed periphery of the said intermediate gears. I prefer to form these points or arms on plates 68 suitably secured to the intermediate gears by pins 69, though I do not wish to limit myself to this way of forming or fastening the points in place. With the intermediate gears, pawls 70 coöperate, these being normally disengaged from the transmitting gears through which the carrying action is performed, as shown in Figs. 6 and 7. These pawls are carried by plates 71 loosely mounted on a pin 72 mounted in the accumulator frame plates. These plates or setting members for the carrying mechanisms have depending tail pieces 73 normally out of the path of movement of the said pins 164 on the pin drum 165, but arranged to be thrown into the path of their respective pins when the arms or points 66 on the carrying gears 67 strike the shoulders or lugs 74 on the setting plates or members.

It will be noticed that I employ three arms or points 66 on the carrying gears, these being located ten teeth apart so that one-third of a revolution of the carrying wheel represents one complete revolution of the number disk, and, as a carrying operation must be performed at each complete revolution of a number disk, the points or arms 66 are properly disposed on the carrying gears so as to accomplish this result.

Figure 10:
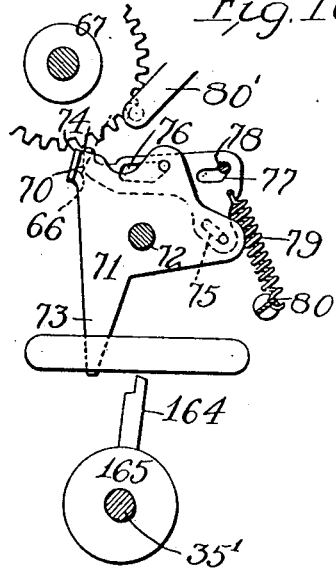
Figure 12:
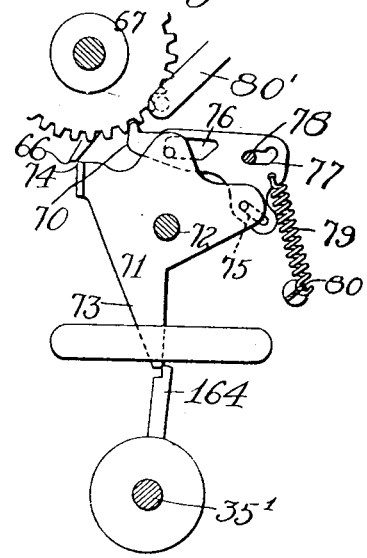
Figure 11:
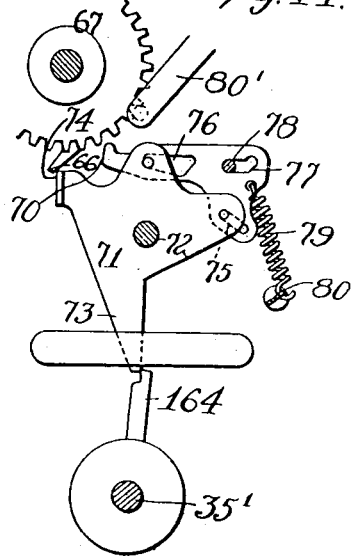
Figure 13:
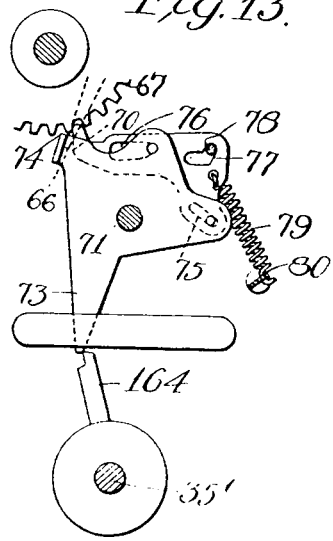

The carrying pawls 70 are mounted upon the setting plates 71 by pins and cam slots at 75, 76, and a cam slot at 77 engages the fixed pin 78 of the accumulator frame, this being fixed in the side plates of said frame. Each pawl is under tension of a spring 79 connected to its tail portion and to a cross bar 80 fixed in the accumulator frame plates. As before stated, the pawls are normally disengaged from the carrying gears and likewise the setting plates have their tail portions normally out of line with their respective pins on the pin drum, as shown in full lines in Fig. 6. Now, supposing the unit number wheel is being turned step by step by the transmitting gear 3, the carrying gear 67 corresponding thereto and which meshes with the transmitting gear 3 will also be turned step by step, but its movement will be without effect until the number disk is about to complete one revolution, when the arm or point 66 on the said carrying gear will contact with the setting plate or member 71 corresponding thereto while the same is in the full line position of Fig. 6 and the dotted line position of Fig. 7, and shown also in Fig. 10 and set the same with its tail in the path of movement of its pin 164 on the drum 165, as shown in dotted lines in Fig. 6, and in full lines in Fig. 11, and, at the same time, the normally disengaged pawl 70 corresponding to the number wheel of the next higher order, will be thrown into position opposite the proper tooth ready to engage with said tooth of its carrying gear, by the setting movement of the setting plate or member, as shown in Fig. 11, and then when the pin drum is rotated in the direction of the arrow, the setting plate will be moved back from the dotted line position of Fig. 6 to normal position, and, at the same time, its pawl will engage and turn the carrying gear as shown in Figs. 12 and 13 so as to carry the units on to the tens number disk or wheel, and as soon as this is accomplished, the pawl will disengage itself from the carrying gear, this being due to the action of the cam slots and pins, and the spring, and this disengagement takes place at the proper moment so that there will be no danger of overthrow, the carrying gear being arrested in proper position by a detent 80′, there being one for each carrying gear, these detents being pivoted to a cross pin or bar 81 of the frame and being under tension of spring, such as at 81ˣ.

Briefly stated, Figs. 10 to 13, inclusive, show the sequence of operations of the carrying mechanism as follows: Fig. 10 shows the parts in normal position. Fig. 11 shows them set back ready to "carry" when actuated by the pin drum. Fig. 12 shows the first action under pressure of the pin drum, and Fig. 13 the final position with the pawl locked in the tooth of the gear to prevent overthrow. When the pin passes the end of the pawl carrier, the pawl drops to the normal position.

A number of advantages accrue from the construction above described over the arrangement disclosed in the patent referred to, among which may be mentioned: By dispensing with the carrying pins on the number disk marked 162 in said patent, which required in addition to the space for the gears on the number disk the space necessary for the pins and levers 161 to work in, I am enabled to use number disks having wider peripheries without increasing the total width of the accumulator mechanism, and thus place numbers of larger size thereon and, consequently, more legible than was possible in the old arrangement. Again, by placing the setting arms or points 66 on the carrying gears instead of upon the number wheels, I can locate these points at a sufficient distance from the center about which they revolve to get a good clearance between the end of the point or arm and the shoulder or lug on the setting arm after striking and setting the same, so that, on the return movement of the setting member, it will not strike the point 66 and turn it, together with the carrying gear and number disk, backward to 9 when it should be turned to zero. Briefly stated, the present arrangement enables the point or arm 66 to have an arc of movement sufficiently long for the step movement of the carrying gear to make the point or arm perform its setting function on the setting plate 71, and then pass beyond the same a sufficient distance to insure a good clearance when the setting plate or member is moved back to normal position, and thus prevent the setting member or plate from striking the point 66 and turning the carrying gear back with it. The carrying pawls are always disengaged excepting when actually operated.

As in the patent above mentioned, the pin drum 165 is rotated through a clutch or pawl and ratchet mechanism indicated generally at 82, this being of substantially the same form as that illustrated in said patent, and needs no particular description herein, suffice it to say that this clutch transmits only the forward rotary movement of the rock shaft 46 to the pin drum, the backward movement of said shaft being without effect on the pin drum. The forward rotation, or, in other words, effective movement of the pin drum takes place on the backward movement of the hand lever 42 to normal position.

I have materially simplified the mechanism for detaining and guiding the selectors, and for detaining the gear trains connected with the number wheels, except when they are to be turned. This mechanism includes a spline or detent bar 83 adapted to engage between the teeth of the selectors, said bar being carried rigidly by a pair of arms 84 fixed on a rock shaft 85 journaled in the frame and having an arm 86 fixed thereon operated by a cam 87 fixed on the rock shaft 46. This cam is formed to give the necessary movements to the spline bar in releasing and reëngaging the selectors at the proper times, for instance, as the hand lever 42 is pulled forwardly, the splined bar is withdrawn from engagement with the selectors, so that these selectors which have been advanced may be free to be turned back to normal position for setting up the numbers on the number disk, and as this movement is completed, the spline or guide bar is thrown again into engagement with the selectors to hold them against displacement and to form a spline or guide to maintain the relation between the selectors while they are moved as a group to the right into engagement with the actuating spline bar 20 and to disengaged position in relation to the number disks and transmitting gears 3. The arms 84 also carry a detent bar 88 to engage the transmitting gears 3 to hold them in proper relation to each other ready for action. The cam 87 is so formed that, as the handle 42 completes its forward movement, after shifting the selectors to the right, the detent bar 88 will be withdrawn from the transmitting gears 3, so that, as the hand lever is returned to its backward or normal position, the number wheels and their gear trains will be free to be turned for the carrying of the values from order to order, which action takes place as above described, from the backward movement of the handle 42 through the pin drum. As soon as this carrying movement is completed, the arms 84 are again moved by the cam 87 to throw the spline or detent bar 83 into engagement with the selectors, so that said selectors will be accurately guided when moved leftward out of engagement with their actuator spline 20, this insuring that the selectors will be guided into engagement with the transmitting gears 3. The same movement of the arms 84 moves the detent bar 88 into engagement with the transmitting gears 3 immediately after the "carrying" operation has been performed, so as to hold the number wheels and their gear trains accurately in the positions they have assumed in relation to each other. The cam 87, for the purposes above described, has peripheral cam portions 89, a grooved by-pass 90 and an automatically operating gate 91 pivoted to the main part of the cam for properly directing the roller or pin 92 on the end of the lever so as to perform the necessary movements.

In order to insure the full movement of the handle 42 when started on its movement either forwardly or backwardly, a lever 93 is provided pivoted to the frame at 94 and bearing, with its cam portion 95, upon a pin 97 on the segment 44. This lever is under tension of a spring 96 and the effect is to press down upon the pin 97 and compel the segment to complete its movement as soon as the pin 97 is carried by the movement of the hand lever across the vertical axial plane of the segment.

*Means for returning number disks to zero.*—This mechanism includes a bar 98 extending across the peripheries of the intermediate or carrying gears 67 and carried by arms 99 pivoted to the accumulator frame at 100, so that said bar will describe an arc the radius of which is larger than and eccentric to the periphery of the carrying gears. The resetting bar is normally held to the rear out of the way of the points 66; a suitable spring being employed for this purpose, but when the bar is moved forwardly by the handle 98ˣ and crank 99ˣ, Fig. 5, it will strike the points of all those number gear trains which are not in zero position, and will move them to such position. It will be noticed that the carrying gears mesh directly with the transmitting gears 3 and that the pawl mechanism is associated directly with the carrying gears, so that, in this respect also, I have simplified the accumulator mechanism, having dispensed with the set of gears 153 disclosed in the said patent.

*Recording mechanism.*—In providing this mechanism I have sought to adapt the machine for connection with any type bar typewriting machine of standard form in which the keys are operated by striking them, and for this purpose I provide connections to be attached to the figure key levers of typewriters of ordinary form. Such a typewriter is indicated at 100', it being shown only in general outline as representative of any suitable form of typewriter to which connection may be made. The figure key levers of such a machine have depending slotted links 100ˣ engaging pins 101 on levers or arms 102 pivoted to the frame, and under tension of springs 103, connected thereto and to the adding key levers. These arms or levers 102 are held up normally against the tension of said springs by trip levers 104 having notched upper ends, engaging pins on the levers 102. The trip levers are pivoted at 105 to the frame and under tension of springs 106 in the base frame. They have arms carrying adjustable contact screws 107 which, in the final part of the downward movement of the adding key lever, will be pressed upon thereby, and thus the trip lever will be operated to release the spring lever or arm 102, and the spring 103 then exerting its force, will pull down the said arm 102 and operate the link connection leading to the typewriter key to operate the same in a manner similar to that of the hand of a typewriter operator. The slotted links 100ˣ permit the typewriting or recording machine to be operated independently of the adding mechanism.

I do not wish to limit myself to the means shown, except where specifically claimed, for carrying out the principle of my invention, as various changes can be made without departing from the spirit of my invention.

The springs 103 are stretched by the levers 24 when the adding keys are operated, and their full power is not constantly exerted, but they come into play to their maximum extent when the adding keys are pressed down.

It will be observed that the carrying points 66 move always in one direction, but by the arrangement of the setting plates and their connection with the pawls by means of the slots 75 the pawls are set by a movement in a direction opposite to that of the carrying points so that when the setting plates are moved back to normal position the pawls will give an advancing movement to the carrying gears.

I claim:—

1. In combination in an adding machine, registering members, keys, pivoted key levers and connections between said key levers and registering members including a shaft, a series of cam arms fixed at different angles thereon, said cam arms having locking notches at the ends of the cams to hold the connections against overthrow, said notches extending at an angle to the cam edges and being concentric with the pivots of the key levers, substantially as described.

2. In combination, registering members, selectors, a spline bar for turning the selectors, keys, a rock shaft operated by said keys, and an arm on the rock shaft, and a link connection between said arm and the spline bar for operating the same, said link being pivotally connected with the spline bar, substantially as described.

3. In combination registering members, selectors, a shaft about which the selectors turn, a spline bar mounted on the shaft, a rock shaft, keys for operating the same, an arm on the rock shaft, an arm connected with the spline bar and turning about the axis of the selectors, and a link connection between the said arms, substantially as described.

4. In combination the register members, keys, a group of selectors, connections between the keys and the selectors for first turning them, including cam shaped arms, a rock shaft upon which the arms are fixed at different angles, each arm having a locking notch to prevent overthrow, escapement mechanism for the selectors, a universal bar operated by the keys, after the said connections have been locked, for operating the escapement, and a handle with connections to the selectors for returning them to normal position for setting up the number, substantially as described.

5. In combination registering members, keys, selectors, a carriage for the selectors, an escapement for the selector carriage operated from the keys, connections between the keys and the selectors for turning them, a cam shaft, a handle for operating the same, a return bar for the selectors, extending through openings in the selectors, and mounted axially of the said selectors, a cam on the cam shaft, and lever connections between said cam and the return bar, substantially as described.

6. In combination register members, selectors, a selector carriage, an escapement, keys, connections between said keys and the selectors for turning them, connections between the keys and the escapement, carrying mechanism, a handle, a shaft operated by the handle, cam means on said shaft, and connections from said cam for returning the selectors to normal position, a pin drum mounted on the shaft and setting members operated thereby for operating the carrying mechanism and carried by said shaft for operating the carrying mechanism, said means including the pin drum and setting members operated thereby, substantially as described.

7. In combination register wheels, selector wheels, key connections for turning the selector wheels, means for moving the selector wheels axially, a detent bar for the register wheels, a detent and guide bar for the selector wheels, a single pair of arms carrying both of said bars, and means for operating said arms, substantially as described.

8. In combination register wheels, selector wheels, key connections for turning the selector wheels, escapement mechanism for the selectors operated from the keys, a handle for turning the selectors back to normal position, with connections therefrom to said selectors, including a cam shaft, and means for returning the selectors to disengaged position, comprising a lever, and a cam on the said cam shaft, substantially as described.

9. In combination register wheels, selector wheels, key connections for turning the selector wheels, escapement mechanism for the selectors operated from the keys, a handle for turning the selectors back to normal position with connections therefrom to said selectors, including a cam shaft, and means for returning the selectors to disengaged position, comprising a lever, a cam on the said cam shaft, carrying mechanism, and means on said cam shaft for operating the said carrying mechanism, substantially as described.

10. In combination regster wheels, selectors, key connections for operating the selectors, an escapement for the selectors, key connections for operating the escapement, a lever connected with the carriage, a cam shaft, a handle for operating the same, a cam on said shaft, a lever operated thereby, and a link connection between the two levers, substantially as described.

11. In combination register wheels, selectors, key connections for operating the selectors, an escapement for the selectors, key connections for operating the escapement, a lever connected with the carriage, a cam shaft, a handle for operating the same, a cam on said shaft, a lever operated thereby, a link connection between the two levers, and a spring connected at its ends with the said levers and serving to move the selectors axially, substantially as described.

12. In combination register wheels, selectors, a carriage, and an escapement therefor, key connections for turning the register wheels, key connections for operating the escapement, carrying mechanism, a rock shaft having means for operating the carrying mechanism, a handle for operating said rock shaft, connections for returning the selectors to normal position, connections for returning the selectors to disengaged position, and means on said rock shaft for operating said connections, substantially as described.

13. In combination register wheels, selectors, a carriage and an escapement therefor, key connections for turning the register wheels, key connections for operating the escapement, carrying mechanism, a rock shaft having means for operating the carrying mechanism, a handle for operating said rock shaft, connections for returning the selectors to normal position, connections for returning the selectors to disengaged position, means on said rock shaft for operating said connections, detents for said selectors, and a cam on said rock shaft with connections therefrom for operating the said detent means, substantially as described.

14. In combination with the register wheels, selector means, a carriage therefor, including a rack bar, escapement means acting on said rack bar, connections for returning the selector means to normal position when disengaged from the register wheels, and a pawl acting upon the rack with means for operating the same to disengage the selector means from the register wheels, whereby the said selector means may be returned to normal position without operating the register wheels, substantially as described.

15. In combination with the register wheels, selector means, a carriage therefor, including a rack bar, escapement means acting on said rack bar and consisting of a rock shaft and a pair of dogs, connections for returning the selector means to normal position when disengaged from the register wheels, and a pawl acting upon the rack with means for operating the same to disengage the selector means from the register wheels whereby the said selector means may be returned to normal position without operating the register wheels, substantially as described.

16. In combination register wheels and carrying mechanism therefor, said carrying mechanism including a pin or pins for each register wheel carried at distances from their center of revolution greater than the radius of the register wheels, pawls set by the operation of said pins, means for operating the pawls, and setting members carrying the said pawls with which the pins contact, and means for operating the said setting members.

17. In combination registering wheels, carrying wheels, carrying pawls normally disengaged from the carrying wheels, pivoted setting members carrying pawls, means for setting the members to throw the pawls into active position but still disengaged from the carrying wheels, and means for operating the setting members for the carrying operation consisting of the pin drum and operating means therefor, substantially as described.

18. In combination registering wheels, carrying wheels, carrying pawls normally disengaged from the carrying wheels, pivoted setting members carrying the pawls, means for setting the members to throw the pawls into active position but still disengaged from the carrying wheels, and means for operating the setting members for the carrying operation consisting of the pin drum and operating means therefor, said pawls having pin and cam slot connection with the setting members, substantially as described.

19. In combination register wheels, carrying wheels carrying pawls normally disengaged from the carrying wheels, pivoted setting members carrying the pawls, means for setting the members to throw the pawls into active position, and means for operating the setting members for the carrying operation, said pawls having pin and cam slot connection with the setting members, and having also pin and cam slot connection with the fixed frame, substantially as described.

20. In combination registering wheels, carrying wheels in connection therewith, and each having a pin or pins located beyond the periphery of the carrying wheels, pawls normally disengaged from the carrying wheels, setting members normally in the path of said pins, and carrying said pawls, and means for operating the setting members to retract the pawls on one movement and on the other movement to first throw the pawls into engagement with the carrying wheels, and in their further movement to turn said wheels, substantially as described.

21. In combination adding mechanism, recording mechanism, a set of numeral keys for each mechanism, with connections to their respective mechanism for operating the same when said keys are depressed, power operated means for operating the numeral recorder keys but normally inactive, and means for rendering said power means operative when the adding keys are depressed to thereby operate the recording mechanism, when the adding mechanism is operated by the adding keys, substantially as described.

22. In combination adding mechanism, recording mechanism, a set of numeral keys for each mechanism, with connections to their respective mechanisms for operating the same when said keys are depressed, power operated means for operating the numeral recorder keys but normally inactive, and tripping means operated by the adding keys for rendering said power means operative when the adding keys are depressed to thereby operate the recording mechanism, when the adding mechanism is operated by the adding keys, substantially as described.

23. In combination adding mechanism, recording mechanism, a set of numeral keys for each mechanism, and means operated by the adding keys to give a striking impulse to the numeral keys of the recording mechanism in simulation of the operation of said keys by striking them with the fingers, substantially as described.

24. In combination adding mechanism, recording mechanism, a set of numeral keys for each mechanism, power operated means for operating the numeral recorder keys but normally inactive, and means for rendering said power means operative when the adding keys are depressed to thereby operate the recording mechanism, said power operated means being placed under tension by the operation of the adding keys, substantially as described.

25. In combination adding means, recording means, a set of numeral keys for each means, power means for operating the recorder numeral keys when released, and means for releasing said power means when the adding keys are operated, said power means having a slip connection with the numeral keys of the recording means.

26. In combination adding mechanism, recording mechanism, a set of numeral keys for each mechanism, means for placing the recorder numeral keys under tension as a result of the operation of the adding keys, and means for releasing said tension means when the adding keys have been operated to a certain point for thereby operating the recorder numeral keys, substantially as described.

27. In combination adding mechanism, recording mechanism, a set of numeral keys for each mechanism, levers connected with the recorder keys, springs connecting the said levers with the adding keys, and a trip for holding said levers, said trip being operated by the adding keys, substantially as described.

28. In combination adding mechanism, recording mechanism, a set of numeral keys for each mechanism, a spring connection between each pair of numeral keys of equal value, and a trip for each spring operated by the adding keys, substantially as described.

29. In combination adding mechanism, including selectors, a carriage and escapement for said selectors, adding keys, recording mechanism, connections for turning the selectors from the adding keys, connections for operating the escapement from the adding keys, and means for operating the recording mechanism as the adding keys complete their movement, substantially as described.

30. In adding and recording mechanism, the combination of a set of numeral typewriter keys, a set of numeral adding keys, escapement mechanism for each set of keys, a carriage for each mechanism, each controlled in its step by step movement by its escapement controlled by its keys, means whereby the adding keys will operate both escapements and carriages, the typewriter keys operating only the escapement carriage belonging thereto, the typewriter carriage being movable in either direction without moving the carriage of the adding mechanism, and means for moving the adding machine carriage independently of the typewriter carriage, substantially as described.

31. In combination adding mechanism, recording mechanism, a set of numeral keys for each mechanism, a plurality of power devices one for each recorder key and normally inactive, the power device of each recorder key being controlled by the corresponding adding key to operate the recording mechanism when the adding mechanism is operated.

32. In combination the number disks, carrying gears, having carrying pins thereon, and carrying pawls with means for setting them from the movement of the carrying pins, said carrying pins moving always in one direction and setting the pawls by a retracting movement thereof in the opposite direction and into a position out of engagement with the carrying gears ready to act thereon, substantially as described.

33. In combination, the number disks, carrying gears having carrying pins thereon, carrying pawls, setting plates and a cam slot connection between the setting plates and carrying pawls for setting the same backwardly when the carrying pins, which always move forward, contact with the said setting plates, substantially as described.

34. In combination registering wheels, carrying wheels in connection therewith, arms on the carrying wheels projecting beyond the peripheries thereof, and forming carrying points, pawls normally disengaged from the carrying wheels, setting members normally in the path of the outer ends of the said arms, said setting members carrying said pawls, and means upon and in a direction opposite to that of the setting plates for operating the setting members when they are thrown into connection therewith by the said arms, substantially as described.

35. In combination, register wheels, carrying wheels, carrying pawls, normally disengaged from the carrying wheels, setting members upon which the carrying pawls are mounted, means for moving the setting members from normal position and setting them in position for operation, a connection between the setting members and the pawls for retracting the pawls when the setting members are moved forward from normal position, and means for moving the setting members to normal position to thereby cause the pawls to turn the carrying wheels, substantially as described.

36. In combination, register wheels, carrying wheels, carrying pawls, normally disengaged from the carrying wheels, setting members upon which the carrying pawls are mounted, means for moving the setting members from normal position and setting them in position for operation, a pin and slot connection between the setting members and the pawls for retracting the pawls when the setting members are moved forward from normal position, and means for moving the setting members to normal position to thereby cause the pawls to turn the carrying wheels, substantially as described.

37. In combination registering wheels, carrying wheels, carrying pawls normally disengaged from the carrying wheels, setting members upon which the carrying pawls are mounted, a plurality of pin and slot connections between the setting members and the pawls, means for moving the setting members from normal position, consisting of pins on the carrying wheels, and means for moving the setting members back to normal position to thereby cause the pawls, through the pin and slot connections, to turn the carrying wheels, substantially as described.

38. In combination registering wheels, carrying wheels, carrying pawls normally disengaged from the carrying wheels, pivoted setting plates having depending tail portions and carrying the pawls at their upper ends, pins on the carrying wheels for moving the upper parts of the setting plates forwardly and their tail portions rearwardly, and connections between the plates and the pawls for retracting the pawls as the plates move forward at their upper portions and for throwing the pawls outwardly and forwardly as the plates turn back, and means for engaging the tail portions of the setting plates to move the said plates back to normal position, substantially as described.

39. In combination with the register and carrying wheels, pivoted setting members, pawls carried by the upper part of said members, pin and slot connections between the setting members and the pawls for retracting the pawls as the adjacent part of the setting members moves forward, means on the carrying wheels for moving the setting members from normal position, and means for returning the setting members to normal position and causing the retracted pawls to advance and turn the carrying wheels, substantially as described.

In testimony whereof, I affix my signature in presence of two witnesses.

SYDNEY B. AUSTIN.

Witnesses:
JOHN H. TRIMBLE,
DWIGHT M. LUDINGTON.